United States Patent [19]
Seliber

[11] 3,859,069
[45] Jan. 7, 1975

[54] VACUUM FREEZING VAPOR COMPRESSION APPARATUS

[75] Inventor: Joseph Seliber, Wilmette, Ill.

[73] Assignee: Pacific Lighting Service Co., Los Angeles, Calif.

[22] Filed: July 19, 1973

[21] Appl. No.: 380,715

Related U.S. Application Data

[62] Division of Ser. No. 154,129, June 17, 1971.

[52] U.S. Cl. .................................................. 62/58
[51] Int. Cl. .............................................. B01d 9/04
[58] Field of Search ................................. 62/58, 123

[56] References Cited
UNITED STATES PATENTS
3,425,235   2/1969   Cox ........................................ 62/58

Primary Examiner—Meyer Perlin
Assistant Examiner—Ronald C. Capossela
Attorney, Agent, or Firm—Christie, Parker & Hale

[57] ABSTRACT

Method and apparatus are provided for recovering a solvent from a solution, particularly useful for recovering potable water from saline water. A unitary apparatus for minimum heat exchange with the environment is described, with the interior divided into a plurality of chambers. Saline water is flash evaporated in an evacuated chamber to produce water vapor, ice crystals, and a somewhat more concentrated brine. The brine-ice slurry is transferred to a washing column wherein it moves upwardly by hydraulic action to overflow the brine into a brine chamber. Ice floating in the wash or separation chamber is cleansed of brine by fresh water sprays. Ice at the top of the separation chamber is scraped by a continuous conveyor to the top of a melting chamber, into which it is free to drop through a grate. Water vapor from the freezing chamber is compressed and discharged into the bottom of the melting chamber with a sufficient flow to form a fluidized bed with the ice crystals entering the top of the chamber. Heat exchange between the water vapor and ice crystals causes condensation and melting, respectively, to produce potable water. Refrigeration coils may be provided for condensing excess water vapor in a flow path beyond the fluidized bed.

2 Claims, 1 Drawing Figure

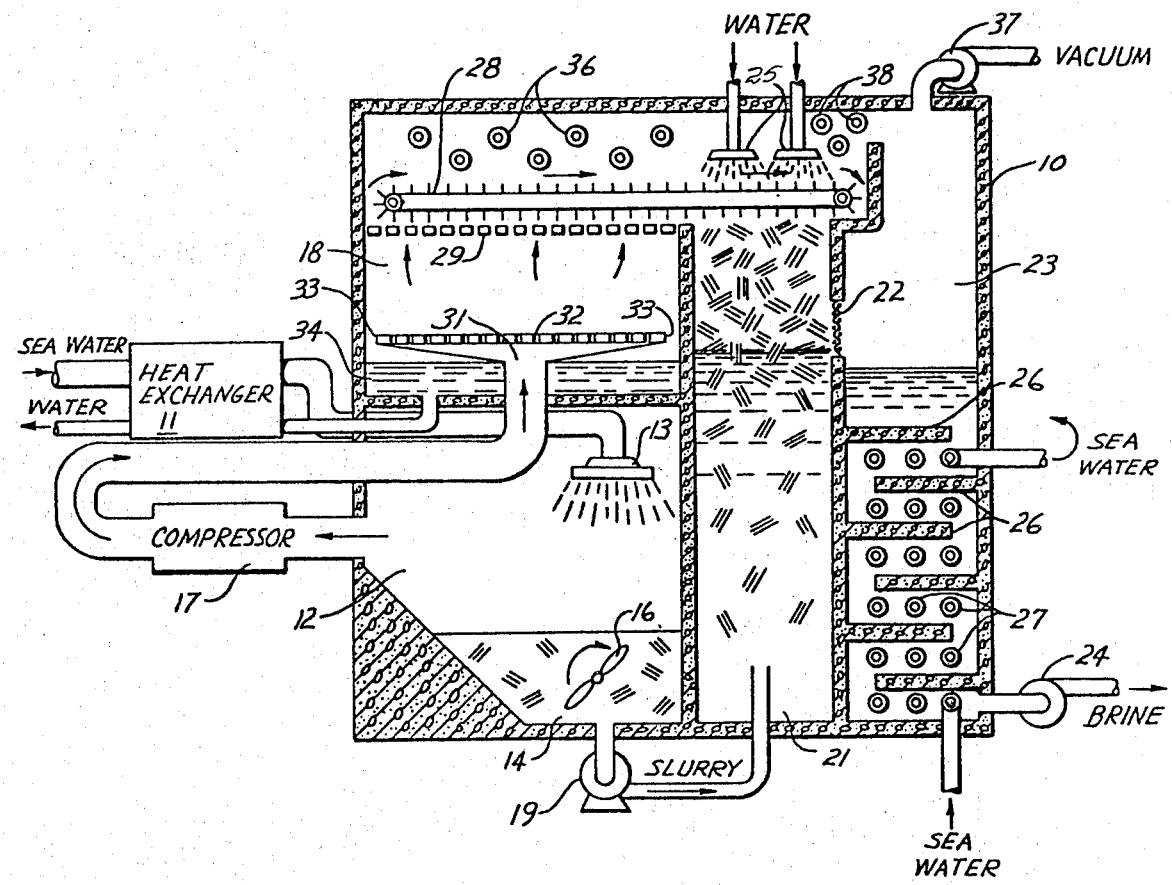

VACUUM FREEZING VAPOR COMPRESSION APPARATUS

CROSS REFERENCE TO RELATED APPLICATIONS

This is a division of Application Ser. No. 154,129, filed 17 June 1971.

BACKGROUND

In many parts of the world the availability of fresh or potable water has become sufficiently small that desalination of seawater or other saline or brackish waters becomes economical. With increasing water usage in years to come, and diminishing supplies of potable water, the economics of desalination become more favorable.

Outside of chemical and osmotic techniques, two principal desalination techniques have been developed. One of these involves distillation of water vapor from heated seawater with subsequent condensation of the water vapor to produce potable water. Considerable experience has been gained with such techniques where excess thermal energy is available, such as, for example, in shipboard installations where waste heat from the engines is employed for distillation. Large scale distillation desalination plants have significant energy requirements.

According to another technique, ice is frozen in seawater, separated from the somewhat concentrated brine, and remelted to yield potable water. The energy requirements for such refrigeration can be excessive. In a variation of this technique, cooled seawater is exposed to a vacuum so that a portion flashes into water vapor, thereby extracting the heat of vaporization from the balance of the water. This causes formation of ice crystals in the water which are then separated from the somewhat concentrated brine. The water vapor is compressed so that its condensation temperature is higher, and the compressed vapor is brought into heat exchange relation with the ice crystals for vapor condensation and ice melting, thereby producing potable water. This technique is known as the vacuum freezing, vapor compression technique. Energy requirements of the technique are reasonable and are principally in the compressor for the water vapor. Some refrigeration is required, as well as vacuum pumping and liquid pumping.

In addition to the energy requirements of a desalination system, the capital investment for the equipment for a large scale plant is of considerable importance. Since the vacuum freezing, vapor compression process operates in a vacuum, strong and impervious construction is required. In order to minimize the size of structure involved, it is important to maximize the flow of materials within the apparatus so that the greatest possible volume of water is produced with a minimum capital expenditure. One limiting factor is the rate of heat exchange in the system.

BRIEF SUMMARY OF THE INVENTION

Therefore, in practice of this invention according to a presently preferred embodiment there is provided a vacuum freezing, vapor compression apparatus and method for desalting saline water. Means are provided for flash evaporating a portion of saline water and freezing another portion of the saline water to form a slurry of ice crystals in brine. Means are provided for separating the water vapor, ice crystals, and brine, and for compressing the separated water vapor. The method also provides for fluidizing a bed of the separated ice crystals with the compressed water vapor for high efficiency heat transfer.

DRAWING

These and other features and advantages of the present invention will be better understood by reference to the following detailed description of a presently preferred embodiment when considered in connection with the accompanying drawing which illustrates semi-schematically a desalination apparatus constructed according to principles of this invention.

DESCRIPTION

The drawing illustrates semi-schematically a vacuum freezing, vapor compression apparatus particularly useful for producing potable water from seawater or other saline water. It will be apparent, however, that the same principles may be employed for recovering other solvents from solutions or concentrating solutions by removal of solvent. The advantages of large size of the apparatus illustrated is particularly advantageous in desalination. It will be apparent to one skilled in the art that the apparatus illustrated in the drawing has many conventional features which are not illustrated therein, such as valves, measurement and control devices, and other accessory equipment. Many conventional aspects of the apparatus are illustrated only schematically herein, and it will be understood that such apparatus may take a variety of conventional forms.

In a presently preferred embodiment, the desalination apparatus is in the form of an elongated rectangular shell 10 of which the drawing is a cross section. Such an arrangement permits the structure to be built in as great a length as desired in order to regulate the desalination capacity of the plant without substantial modification of the mechanisms and structures involved. If desired, the entire facility can be in fluid communication, or, if desired, it can be subdivided into shorter segments. Basically, the shell is a reinforced concrete rectangular building providing substantially all of the operating functions within the same shell for minimum heat exchange with the environment. Concrete is not only an economical material from which to fabricate this structure, but by employing porous aggregate or air injection techniques, substantial thermal insulation is also obtained in the shell itself. If desired, conventional foamed, plastic insulation or the like can be applied to the concrete shell for added thermal insulation.

Seawater is first passed through a heat exchanger 11, indicated only schematically, before introduction into the apparatus. In the drawing, the seawater is shown in counter-current flow to the potable water produced by the apparatus. It is also precooled by heat exchange with the brine remaining after desalination, and may also be cooled by additional refrigeration in order to extract as much heat as possible from seawater. Heat exchange with the brine and potable water also conserves the refrigeration energy required in the system. The heat exchange and precooling of the seawater is conventional and except as illustrated schematically herein is not illustrated.

The precooled seawater is discharged into a freezing chamber 12 through a conventional spray nozzle 13 illustrated schematically. Water vaporizes from the droplets from the spray nozzle into the freezing chamber 12, and the resultant cooling of the droplets initiates ice formation. By suitable adjusting the size and shape of the spray from the nozzle 13, the size of the resultant ice crystals can be to some extent regulated in order to produce an optimum size crystal for utilization in the balance of the apparatus. Other flash evaporation techniques may be employed if desired.

Preferably, the pressure in the freezing chamber 12 is maintained at about 3.4 millimeters of mercury pressure so that flash evaporation occurs from the spray droplets. Further vaporization occurs from the surface of an ice-brine slurry 14 that accumulates in the bottom of the freeze chamber. One or more agitators 16 are preferably provided in the slurry so as to break the surface of the pool and expose additional surface to the evacuated region within the freezing chamber for enhanced evaporation. Any conventional means for agitating can be provided, and this is illustrated only schematically.

Water vapor formed in the freezing chamber 12 is drawn out and the pressure is maintained at a low value by a compressor 17. Preferably, a high efficiency axial flow compressor is employed for minimized energy requirements. The spray nozzle 13 is preferably located relatively remote from the entrance to the compressor 17 so that the entrainment of water droplets is minimized. The compressor entrance is preferably located relatively high in the freezing chamber (higher than illustrated in the schematic), and there is preferably a relatively large cross section portion between the compressor entrance and the spray nozzle to permit water droplets to fall out of the water vapor stream rather than being sucked into the compressor. If desired, conventional centrifugal separators or other means may be provided for minimizing entrainment of water droplets into the compressor.

The axial flow compressor 17 raises the pressure of the water vapor to about 4.8 millimeters of mercury, thereby also increasing the dew point, or temperature at which the water vapor will condense. An appreciable amount of energy is added to the water vapor as it passes through the compressor, and if desired additional refrigeration can be employed to extract heat from the water vapor; however, this is not generally desirable in the illustrated arrangement. The compressor 17 is preferably located outside of the concrete shell 10 so that ready access can be had for routine maintenance. Insulation of the vapor flow conduits is, of course, desirable. The discharge end of the compressor 17 passes water vapor into a melting chamber 18, hereinafter described in greater detail.

A pump 19 removes the ice-brine slurry from the bottom of the freezing chamber 12 and transfers it to the bottom of a separation or wash chamber 21. The slurry of ice and brine in the separation chamber or wash column 21 acts as a hydraulic piston wherein the ice crystals are buoyed up to the upper portion and float on a column of brine. Near the upper portion of the separation chamber 21 is a screen 22 which permits brine to overflow from the separation chamber 21 into a brine overflow chamber 23. The screen 22 prevents the ice crystals from passing into the brine chamber. The height of the overflow screen 22 above the bottom of the separation chamber 21 is sufficient to buoy up a substantial thickness of ice crystals above the upper liquid surface. Cold potable water is sprayed onto the top portion of the floating ice crystals in the separation chamber 21 from a plurality of nozzles 25. This fresh potable water percolates down through the bed of ice crystals and washes brine from the surfaces so that when the crystals reach the top of the separation chamber they are substantially free of salt.

The brine in the brine overflow chamber 23 is removed at the bottom by a pump 24 and returned to the sea. In the illustrated arrangement a series of baffles 26 are provided in the brine overflow chamber, and pipes 27 run in the spaces between the baffles so that the brine comes in good thermal contact with the pipes. Fresh seawater is passed through the pipes 27 so as to be cooled by the brine before being cycled into the input to the freezing chamber. Although one type of heat exchanger between the relatively cold brine and relatively warm seawater has been illustrated, it will be apparent that many other such heat exchangers can be provided if desired. Such heat exchange can also be either serial or parallel to the heat exchange of sea water with potable water.

A continuous belt scraper 28 is provided across the top of the separation chamber 21 and the melting chamber 18. The scraper operates in a direction for scraping ice crystals from the top of the separation chamber and passing them laterally over a grate 29 over the top of the melting chamber 18. The grate 29 can be provided with staggered or varying sized holes for permitting ice crystals to fall into the melting chamber in a relatively uniform distribution throughout its upper extent.

The compressed water vapor from the compressor 17 enters a plenum 31 spaced above the bottom of the melting chamber 18. The top of the plenum 31 is a conventional deck 32 such as commonly employed in fluidized bed reactors. Such a deck has a large number of apertures through which gas may flow in order to obtain uniform gas distribution throughout a fluidized bed. A fluidized bed is an arrangement that permits very high heat transfer between a flowing gas and particles of material suspended therein. In a fluidized bed a gas is passed into the bottom of the bed at a sufficient velocity to buoy up the particles therein and maintain a sufficient agitation that the mixture of gas and particles behaves largely like a conventional liquid. The gas velocity that is required to maintain a bed of particles in sufficient agitation to be fluidized depends on the densities of the gas and particles, and the size of the particles.

Once a bed is fluidized, exchange reactions occurring between the gas and particles are extremely rapid, and a high degree of temperature uniformity is normally encountered in a fluidized bed. The gas introduced at the bottom of the bed passes upwardly through the mixture and exits through the top. The solids can be extracted at virtually any point in the bed since they behave generally as a liquid. In the illustrated arrangement a narrow space 33 is provided between the edge of the deck 32 and the walls of the melting chamber. Particles in the fluidized bed can then pass downwardly at the periphery and accumulate as a pool of water 34 in the bottom of the melting chamber.

In a typical fluidized bed, the volume of gas passing through any horizontal cross section of the bed is substantially equal to the volume of gas passing through any other horizontal section. The particle size distribution in such a bed is, therefore, substantially uniform.

In the illustrated fluidized bed the gas passing upwardly through the deck 32 is principally water vapor which during its course of passage through the fluidized bed tends to condense on particles of ice falling through the grate 29. This condensation on the particles has several effects. It reduces the volume and hence velocity of gas flowing upwardly through the fluidized bed so that the volume of gas is less near the top of the bed and greater nearer the bottom of the bed. It causes an increase in the size of the particles due to accumulation of additional condensed water so that the particles most recently entering the fluidized bed are relatively smaller and those that have been in the bed longer are relatively larger. Condensation also adds the heat of vaporization to the particles so that the ice crystals are melted, and eventually the particles are converted from ice crystals to droplets of liquid water. These droplets which are in rapid motion in the fluidized bed tend to coalesce as they encounter each other, and this further increases the "particle" size in the fluidized bed.

Because of the gradation in particle sizes produced as condensation continues and coalescence occurs, and also because of the decrease in gas volume flowing upwardly through the fluidized bed, the particle size distribution through the fluidized bed is not uniform. Thus, at the top portion of the bed, that is, relatively nearer the upper grate 29, the fluidized bed comprises principally small ice crystals in a relatively low flow of water vapor. Nearer the bottom of the bed, the mixture comprises relatively larger droplets of water buoyed up by a relatively larger volume of upwardly flowing water vapor. It is these relatively larger droplets of water that flow through the spaces 33 at the edges of the deck 32 and accumulate in the bottom of the melting chamber. Some of the water droplets also contact and wet the walls of the melting chamber and flow down into the pool 34 at the bottom. Because of the high degree of motion in the fluidized bed between the deck 32 and grate 29, a very high rate of heat transfer is obtained, and melting of the ice and condensing of the water vapor occurs in a relatively small volume, thereby minimizing the required size of the desalination apparatus.

If desired, in order to maintain a sufficient flow velocity of water vapor in the fluidized bed, the cross section of the melting chamber 18 can be nonuniform vertically, that is, the chamber may be narrower near its top portion than near its bottom portion for maintaining an adequate gas velocity throughout the fluidized bed for buoying the ice and water particles.

In a typical vacuum freezing vapor compression apparatus, the incoming saline water is deaerated to minimize the volume of inert gas that must be handled by the vacuum pumps that maintain a vacuum in the apparatus. In the illustrated arrangement where the water vapor is thermally contacted with the ice crystals in a fluidized bed, it may be desirable to avoid the deaeration step so that some air remains dissolved in the incoming saline water. This additional air is then available to pass through the melting chamber for fluidizing the bed. By not deaerating the incoming saline water, however, the dissolved air must be compressed by the compressor 17 at a substantial energy expenditure, and if additional gas flow is required for fluidization, it is preferred to add air on the pressure side of the compressor to avoid the additional compressor energy required. Any air so added must, however, be extracted by a vacuum pump beyond the melting chamber in order to maintain a sufficiently low pressure in the vaporization chamber.

After passing through the fluidized bed in the melting chamber 18 and through the cold grate 29 where additional condensation may occur, any remaining water vapor contacts refrigeration coils 36 in the head space above the conveyor 28. The refrigeration coils 36 are maintained at a sufficiently low temperature that any remaining water vapor condenses thereon, preferably in the form of liquid so that it can drip into the melting chamber. If the refrigeration coils 36 are maintained at a temperature that ice forms on the surfaces, periodic heating may be employed for melting the ice and recovering the potable water. Any noncondensable gases remaining in the system after water vapor has been stripped by the refrigeration coils 36 is removed by a vacuum pump 37. Additional refrigeration coils 38 may be provided in the apparatus for recovering any additional water vapor flashed from the spray nozzles 23.

Although but one embodiment of vacuum freezing, vapor compression apparatus constructed according to principles of this invention has been described and illustrated herein, many modifications and variations will be apparent to one skilled in the art. It is, therefore, to be understood that within the scope of the appended claims the invention can be practiced otherwise than as specifically described.

What is claimed is:

1. A method for desalting saline water comprising the steps of:
   flash evaporating a portion of saline water and freezing another portion of the saline water to form ice crystals;
   separating the water vapor, ice crystals, and brine;
   compressing the water vapor; and
   fluidizing a bed of the ice crystals with the compressed water vapor comprising the steps of:
      introducing separated ice crystals near the top of a bed; and
      introducing compressed water vapor through a deck near the bottom of the bed with sufficiently uniform gas distribution, at a sufficient velocity to buoy up the ice crystals, and a sufficient agitation therein that the mixture of water vapor and crystals behaves largely like a liquid in the bed.

2. A method for desalting saline water as defined in claim 1 further comprising the step of condensing excess water vapor subsequent to the fluidizing step.

* * * * *